United States Patent [19]

Stevenson et al.

[11] Patent Number: 5,100,842

[45] Date of Patent: Mar. 31, 1992

[54] GLASS COMPOSITIONS

[75] Inventors: John P. Stevenson; John F. Collins, both of Sussex, England

[73] Assignee: United States Borax & Chemical Corporation, Los Angeles, Calif.

[21] Appl. No.: 554,059

[22] Filed: Jul. 16, 1990

[30] Foreign Application Priority Data

Apr. 25, 1990 [GB] United Kingdom ............... 900924

[51] Int. Cl.$^5$ .................. C03C 11/20; C03C 3/09; C03C 12/00; C03C 3/064
[52] U.S. Cl. ............................ 501/66; 501/33; 501/39; 501/77
[58] Field of Search .............. 501/39, 66, 77, 33

[56] References Cited

U.S. PATENT DOCUMENTS

| | | | |
|---|---|---|---|
| 2,681,289 | 6/1954 | Moore | 501/66 |
| 2,834,738 | 5/1958 | Vincent | 501/66 |
| 3,207,588 | 9/1965 | Slaytor et al. | 501/66 |
| 3,459,630 | 8/1969 | D'Eustachio et al. | 501/39 |
| 3,843,376 | 10/1974 | Cornelissen et al. | 501/66 |
| 4,215,033 | 7/1980 | Bowen | 501/66 |
| 4,983,550 | 1/1991 | Goetz et al. | 501/66 |

*Primary Examiner*—Mark L. Bell
*Attorney, Agent, or Firm*—James R. Thornton

[57] ABSTRACT

Glass compositions for use in the preparation of glass microspheres and having reduced 2 Pas (20 poise) temperatures comprise 38 to 44% $SiO_2$, 14 to 22% $B_2O_3$, 9 to 16% $Al_2O_3$, 22 to 26% CaO and optionally MgO, 0 to 8% $Na_2O$, 0 to 2% $Li_2O$, 0 to 2% $K_2O$ and 0 to 1% $Fe_2O_3$, the sum of $B_2O_3$ and $Na_2O$ being at least 19%, said percentage by weight.

10 Claims, No Drawings

GLASS COMPOSITIONS

The invention relates to glass compositions for use in the preparation of glass microspheres.

BACKGROUND OF THE INVENTION

Hollow glass microspheres (e.g. 0.5 mm) are used, for example, as bulk, lightweight fillers for reinforced plastic components for the motor industry. They find use also as hollow microbubbles for adhesives. They can be prepared, for example, by pulsing an inert gas, such as argon into a continuous stream of molten glass in order to produce individual microspheres. For best results, the molten glass should be at a temperature such that the melt has a viscosity of about 2 Pas (20 poise). This temperature is known as the 20 poise temperature (20 PT). The glass compositions previously proposed for use in the preparation of hollow glass microspheres in this way have had 20 PT values in the region of 1440° to 1450° C. For example, a standard E-Glass composition (analyzing 53.4 wt % $SiO_2$, 13.9 wt % $Al_2O_3$, 8.9 wt % $B_2O_3$, 21.7 wt % CaO, 0.3 wt % $Na_2O$ and 0.7 wt % $K_2O$), such as is used in providing glass fibers for reinforcing plastics, has a 20 PT of 1447° C. A borosilicate glass composition used in the preparation of glass microspheres (analyzing 44.7 wt % $SiO_2$, 12.5 wt % $Al_2O_3$, 14.1 wt % $B_2O_3$, 26.3 wt % CaO, 0.6 wt % $Na_2O$ and 0.7 wt % $K_2O$) has a PT of 1444° C. Such high 20 PT values can cause a reduced service life for metal parts, such as platinum bushings, employed in the manufacture of microspheres and are of course associated with high energy requirements. Accordingly it is desired to provide glass compositions suitable for use in the preparation of glass microspheres but having lower 20 PT values than the glass compositions hitherto used.

DESCRIPTION OF THE INVENTION

This invention provides glass compositions for use in the preparation of glass microspheres comprising 38 to 44% $SiO_2$, 14 to 22% $B_2O_3$, 9 to 16% $Al_2O_3$, 22 to 26% CaO, 0 to 8% $Na_2O$, 0 to 2% $Li_2O$, 0 to 2% $K_2O$ and 0 to 1% $Fe_2O_3$, the sum of $B_2O_3$ and $Na_2O$ being at least 19%, said percentages being by weight. Optionally, a portion of the CaO in the composition, such as up about 50%, may be substituted by MgO.

Preferably the glass composition comprises 39 to 43% $SiO_2$, 19 to 22% $B_2O_3$, 9 to 13% $Al_2O_3$, 22 to 26% CaO and optionally MgO, 4 to 6% $Na_2O$, 0 to 1% $K_2O$ and 0.2 to 0.4% $Fe_2O_3$. A particularly preferred composition is one which consists essentially of about 40% $SiO_2$, about 11% $Al_2O_3$, about 20% $B_2O_3$, about 23% CaO, about 5% $Na_2O$, about 1% $K_2O$, and about 0.3% $Fe_2O_3$, said percentages by weight.

The glass compositions provided in accordance with this invention preferably have 20 PT values below about 1350° C., especially below 1300° C.

The $B_2O_3$ content, either alone or combined with the $Na_2O$ content, has an important effect in reducing the 20 PT value. When the $B_2O_3$ content is too high, say 25 to 30 wt %, the glass becomes opalescent and its viscosity is undesirably increased. The optimum $B_2O_3$ content is from 20 to 21% when the glass composition contains 0 to 5% $Na_2O$.

Additions of $Li_2O$ and/or $Na_2O$ have been found to be effective in lowering 20 PT values. However, the durability of glasses containing too much of these ingredients can be adversely affected. Durability is measured as the amount of sodium (or alkali equivalent) leached from a glass after treatment in water for 1 hour at 98° C. (See ISO-719-1985 "Glass-Hydrolytic Resistance of Glass Grains at 98° C., Materials for Test and Classification"). Sodium loss provides an inverse measure of durability, i.e. more durable glasses have low sodium losses. A balance should therefore be sought between improving (lowering) the 20 PT value and worsening the durability. A particularly preferred $Na_2O$ content is about 5 wt % since it has been found that this amount of $Na_2O$ can be more effective in lowering the 20 PT value than a lower amount (e.g. 2.5 wt %) or higher amount (e.g. about 7.5 wt %). Weight for weight $Li_2O$ is more effective in reducing the viscosity of a glass (i.e. is a better flux) than $Na_2O$, but is more expensive.

$Al_2O_3$ is a refractory material and increases the viscosity of most glasses. It is generally added to glasses to improve their aqueous durability. The optimum amount is from 9 to 14%, especially 9 to 11%, $Al_2O_3$.

Preferably the glass compositions contain CaO rather than both CaO and MgO. Nevertheless mixtures of CaO and MgO can be used if desired, the amount of MgO suitably being up to about half the total amount of CaO and MgO.

$Fe_2O_3$ is normally present in E-type glasses to improve radiation heat transfer into the glass during gas firing and heat radiation from fibers during cooling. It can be present, for example in amounts of up to 1 wt %, preferably 0.2 to 0.4 wt %, especially about 0.3 wt %, in the glass compositions of this invention to improve heat transfer. $Fe_2O_3$ also contributes to the fluxing action.

This invention also relates to the use of the glass compositions in the preparation of glass microspheres. This can suitably be done by pulsing an inert gas, preferably argon, into a continuous melt of said glass compositions to produce inidividual microspheres. The melt will preferably have a viscosity of about 2 Pas (20 poise).

EXAMPLES

The invention is illustrated by reference to the following Examples and comparative Examples.

Glass formulations were melted. The viscosity: temperature relationships were measured and the temperature at which the viscosity was 2 Pas (20 poise) was extrapolated (above 1400° C.) or interpolated (below 1400° C.). Details of the target compositions and of the results of analysis are given in the following Table, together with the 20 PT values. For some of the glasses durability was measured in accordance with the method referred to above and the results also appear in the Table. Examples 13–21 are comparative examples.

TABLE

| EX | Target Composition (wt %) | | | | | | Analysis (wt %) | | | | | | | 20 PT (°C.) | Durability (μg Na₂O/g glass) |
|---|---|---|---|---|---|---|---|---|---|---|---|---|---|---|---|
| | SiO₂ | Al₂O₃ | B₂O₃ | CaO | Na₂O | Other | SiO₂ | Al₂O₃ | B₂O₃ | CaO | Na₂O | K₂O | Other | | |
| 1 | 41.3 | 12.2 | 20.5 | 25.6 | | | 41.3 | 11.9 | 20.9 | 25.2 | 0 | 0.7 | | 1301 | 87 |
| 2 | 41.3 | 12.2 | 20.5 | 14.0 | | 12.0a | 42.0 | 12.1 | 21.9 | 14.1 | 0.1 | 0.7 | 8.9a | 1344 | |
| 3 | 45.0 | 13.2 | 15.3 | 25.5 | | 1.0b | 44.6 | 13.3 | 15.8 | 24.7 | 0.7 | 0.8 | 0.9b | 1349 | |
| 4 | 43.4 | 12.1 | 14.3 | 25.1 | 5.1 | | 43.5 | 11.7 | 14.2 | 23.7 | 5.3 | 0.8 | | 1260 | |

TABLE-continued

| EX | Target Composition (wt %) | | | | | | Analysis (wt %) | | | | | | | 20 PT (°C.) | Durability (μg Na₂O/g glass) |
|---|---|---|---|---|---|---|---|---|---|---|---|---|---|---|---|
| | $SiO_2$ | $Al_2O_3$ | $B_2O_3$ | CaO | $Na_2O$ | Other | $SiO_2$ | $Al_2O_3$ | $B_2O_3$ | CaO | $Na_2O$ | $K_2O$ | Other | | |
| 5 | 39.5 | 11.4 | 19.8 | 23.9 | 5.0 | | 39.7 | 11.1 | 19.5 | 23.1 | 5.3 | 0.7 | | 1215 | 170 |
| 6 | 41.6 | 11.9 | 15.8 | 23.4 | 5.0 | | 38.6 | 12.3 | 16.7 | 26.1 | 5.4 | 0.7 | | 1231 | |
| 7 | 40.6 | 11.7 | 18.0 | 24.6 | 5.1 | | | | | | | | | c1250 | |
| 8 | 38.6 | 11.1 | 22.0 | 23.4 | 4.9 | | | | | | | | | c1300 | |
| 9 | 40.7 | 11.8 | 20.4 | 24.6 | 2.5 | | 35.0 | 12.2 | 21.7 | 28.1 | 2.5 | 0.7 | | c1280 | 161 |
| 10 | 38.6 | 11.1 | 19.4 | 23.4 | 7.5 | | 38.2 | 10.5 | 19.3 | 23.0 | 7.2 | 0.6 | | 1237 | 186 |
| 11 | 38.8 | 13.5 | 19.4 | 23.4 | 4.9 | | | | | | | | | 1326 | |
| 12 | 37.6 | 16.0 | 18.9 | 22.7 | 4.8 | | | | | | | | | c1300 | |
| 13 | | | | | | | 53.4 | 13.9 | 8.9 | 21.7 | 0.3 | 0.7 | | 1447 | 22 |
| 14 | 43.6 | 13.4 | 15.5 | 25.7 | | | 44.7 | 12.5 | 14.1 | 26.3 | 0.6 | 0.7 | | 1444 | 101 |
| 15 | 53.5 | | 20.5 | 14.0 | | | | | | | | | | Very viscous. | |
| 16 | 52.0 | 6.0 | 16.0 | 26.0 | | | | | | | | | | Opalized | |
| 17 | 38.0 | 11.0 | 25.0 | 26.0 | | | | | | | | | | Poor glass formation. | |
| 18 | 39.5 | 11.7 | 25.0 | 23.8 | | | | | | | | | | Opalescence | |
| 19 | 37.0 | 11.0 | 29.9 | 21.9 | | | | | | | | | | Viscosity not measured | |
| 20 | 47.1 | 10.6 | 15.6 | 26.4 | | | | | | | | | | 1364 | |
| 21 | 48.0 | 9.1 | 15.7 | 26.9 | | | | | | | | | | 1369 | |

Footnotes:
a wt. % MgO
b wt % $Li_2O$
c Approximation

A comparison of the properties of Examples 1–12 with examples 13–21 shows the significant improvement in viscosity obtained with the compositions of this invention while retaining their aqueous durability and other desirable properties.

Various changes and modifications of the invention can be made and, to the extent that such variations incorporate the spirit of this invention, they are intended to be included within the scope of the appended claims.

What is claimed is:

1. A glass composition for use in the preparation of hollow glass microspheres comprising 38 to 44% $SiO_2$, 14 to 22% $B_2O_3$, 9 to 16% $Al_2O_3$, 22 to 26% CaO, 0 to 8% $Na_2O$, 0 to 2% $Li_2O$, 0 to 2% $K_2O$ and 0 to 1% $Fe_2O_3$, the sum of $B_2O_3$ and $Na_2O$ being at least 19%, said percentages by weight, said composition having a 20 poise temperature value below about 1350° C.

2. A glass composition according to claim 1 which comprises 39 to 43% $SiO_2$, 19 to 22% $B_2O_3$, 9 to 13%, $Al_2O_3$, 22 to 26% CaO, 4 to 6% $Na_2O$ and 0 to 1% $K_2O$.

3. A glass composition according to claim 1 which contains 20 to 21% $B_2O_3$ and 0 to 5% $Na_2O$.

4. A glass composition according to claim 1 consisting essentially of about 40% $SiO_2$, about 11% $Al_2O_3$, about 20% $B_2O_3$, about 23% CaO, about 5% $Na_2O$ and about 1% $K_2O$.

5. A glass composition according to claim 1 in which up to about 50% of said CaO is replaced by MgO.

6. A glass composition according to claim 2 in which up to about 50% of said CaO is replaced by MgO.

7. A glass composition according to claim 2 in which 0.2 to 0.4% $Fe_2O_3$ is included.

8. A glass composition according to claim 2 which contains 20 to 21% $B_2O_3$.

9. A glass composition according to claim 4 in which about 0.3% $Fe_2O_3$ is included.

10. A glass composition according to claim 2 in which said 20 poise temperature value is below about 1300° C.

* * * * *